United States Patent [19]

Matouka

[11] Patent Number: 4,471,278
[45] Date of Patent: Sep. 11, 1984

[54] BANG-BANG CURRENT REGULATOR HAVING EXTENDED RANGE OF REGULATION

[75] Inventor: Michael F. Matouka, Utica, Mich.

[73] Assignee: General Motors Corporation, Detroit, Mich.

[21] Appl. No.: 531,864

[22] Filed: Sep. 14, 1983

[51] Int. Cl.³ ............................................. G05B 13/02
[52] U.S. Cl. ..................................... 318/561; 318/587; 318/611; 318/257
[58] Field of Search ............... 318/255, 256, 257, 268, 318/561, 597, 580, 587, 596, 611, 615, 616, 617, 619

[56] References Cited

U.S. PATENT DOCUMENTS

| | | | |
|---|---|---|---|
| 3,166,143 | 1/1965 | Gonter et al. | 318/587 X |
| 3,604,907 | 9/1971 | Wesner | 318/580 X |
| 3,764,885 | 10/1973 | Buxbaum et al. | 318/257 X |
| 3,927,360 | 12/1975 | MacMullan | 318/611 X |
| 3,974,431 | 8/1976 | Adams | 318/561 |
| 3,984,740 | 10/1976 | Wright | 318/268 |

Primary Examiner—B. Dobeck
Assistant Examiner—Bentsu Ro
Attorney, Agent, or Firm—Mark A. Navarre

[57] ABSTRACT

The regulation range of a conventional bang-bang current regulator is extended by altering the current command or feedback signals to cause the feedback signal to exceed the command signal sooner in time than it otherwise would and fall below the command signal later in time than it otherwise would. For relatively low command signal values, the current is regulated in a discontinuous series of reduced peak excursion pulses, enabling the average value of current to be regulated down to a lower value than possible without the alteration.

3 Claims, 12 Drawing Figures

BANG-BANG CURRENT REGULATOR HAVING EXTENDED RANGE OF REGULATION

This invention relates to a motor current controller for use in an electric motor assisted power steering system and more particularly to a bang-bang current regulator for controlling the motor current to provide the desired level of steering assist.

Broadly, a bang-bang regulator establishes upper and lower trip limites for a controlled parameter relative to the desired value of the parameter. A switching control is effected which causes the actual value of the controlled parameter to bang back and forth between the upper and lower trip limits. In this way, the average value of the controlled parameter corresponds to the desired value.

In an electric motor assisted power steering system of the type envisioned by this invention, the motor current is controlled in direct relation to the steering torque exerted on the steering wheel by the operator of the vehicle to provide a steering assist torque. Thus, the controlled parameter is the motor current and the bang-bang regulator establishes upper and lower trip limits about a desired value determined in relation to the operator exerted steering torque.

The electric motor is connected to a voltage source such as the vehicle battery when the motor current falls below the lower trip limit and is disconnected from the voltage source when the motor current rises above the upper trip limit. As a result, the instantaneous motor current is continuous, and the average motor current is regulated at the desired current value.

A bang-bang current regulator of the type described above may be implemented with relatively simple circuitry and is considered advantageous due to its inherent stability and fast response. In addition, separate current limiting circuitry is not required since the bang-bang regulator disconnects the motor from the voltage source when the motor current reaches the upper trip limit. However, the conventional bang-bang current regulator is unable to regulate the controlled parameter when the desired value of the parameter is less than half of the difference between the upper and lower trip limits. In such case, the motor current cannot fall below the lower trip limit. Consequently, the motor cannot be reconnected to the voltage source and the controlled parameter of motor current stays at zero. The opposite effect is experienced when the desired value is subsequently increased. The motor current stays at zero until the desired value rises above one-half the difference between the upper and lower trip limits.

The operation described above is generally depicted in FIG. 3 herein and results in an abrupt drop and rise in the average motor current as the desired value of the motor current is decreased toward zero and then increased. In the power steering system described above, such operation results in objectionable steering assist surges when the steering wheel is in the vicinity of the on-center position.

One way to extend the range of a bang-bang current regulator is to design the regulator such that the difference between the upper and lower trip limits is very small. However, this is not a practical solution since to do so would significantly increase the motor current switching frequency, greatly increasing switching losses in the motor current control devices.

Accordingly, it is an object of this invention to provide an improved bang-bang current regulator for an electric motor wherein the average motor current may be smoothly regulated substantially to zero.

It is a further object of the invention to provide an improved bang-bang current regulator for an electric motor wherein the motor current becomes regulated in a discontinuous series of reduced peak excursion pulses as the desired current value is reduced so that the average motor current may be regulated to a lower value than could otherwise be attained.

The above objects are carried forward by altering either the current feedback signal or the current command signal so that the controller operates to produce motor current in a discontinuous series of pulses when the current command signal is in the lower end of its range. In this way, the average motor current may be regulated to a much lower value than possible without the alteration. According to a first embodiment, the current feedback signal is altered and according to a second embodiment, the current command signal is altered. In either case, the function is the same—to make the feedback signal fall below the lower trip limit later in time than it otherwise would and to make the feedback signal rise above the upper trip limit sooner in time than it otherwise would. The amount by which the command or feedback signal is altered remains essentially constant for the entire range of circuit operation and serves to produce reduced peak motor current excursion and discontinuous motor current when the current command signal is in the lower end of its range. In each switching cycle, the current command or current feedback signal is altered by a fixed and generally constant amount while the motor is connected to the voltage source and the alteration amount is progressively decreased beginning when the motor is disconnected from the voltage source.

IN THE DRAWINGS

FIG. 1 is a circuit diagram of a conventional bang-bang current regulator in the environment of an electric motor assisted power steering system.

FIGS. 2 and 3 are graphs depicting the operation of the current regulator shown in FIG. 1. FIG. 2 depicts the signals being compared by the regulator; FIG. 3 depicts a current command signal and the resulting motor current.

Figure 1:
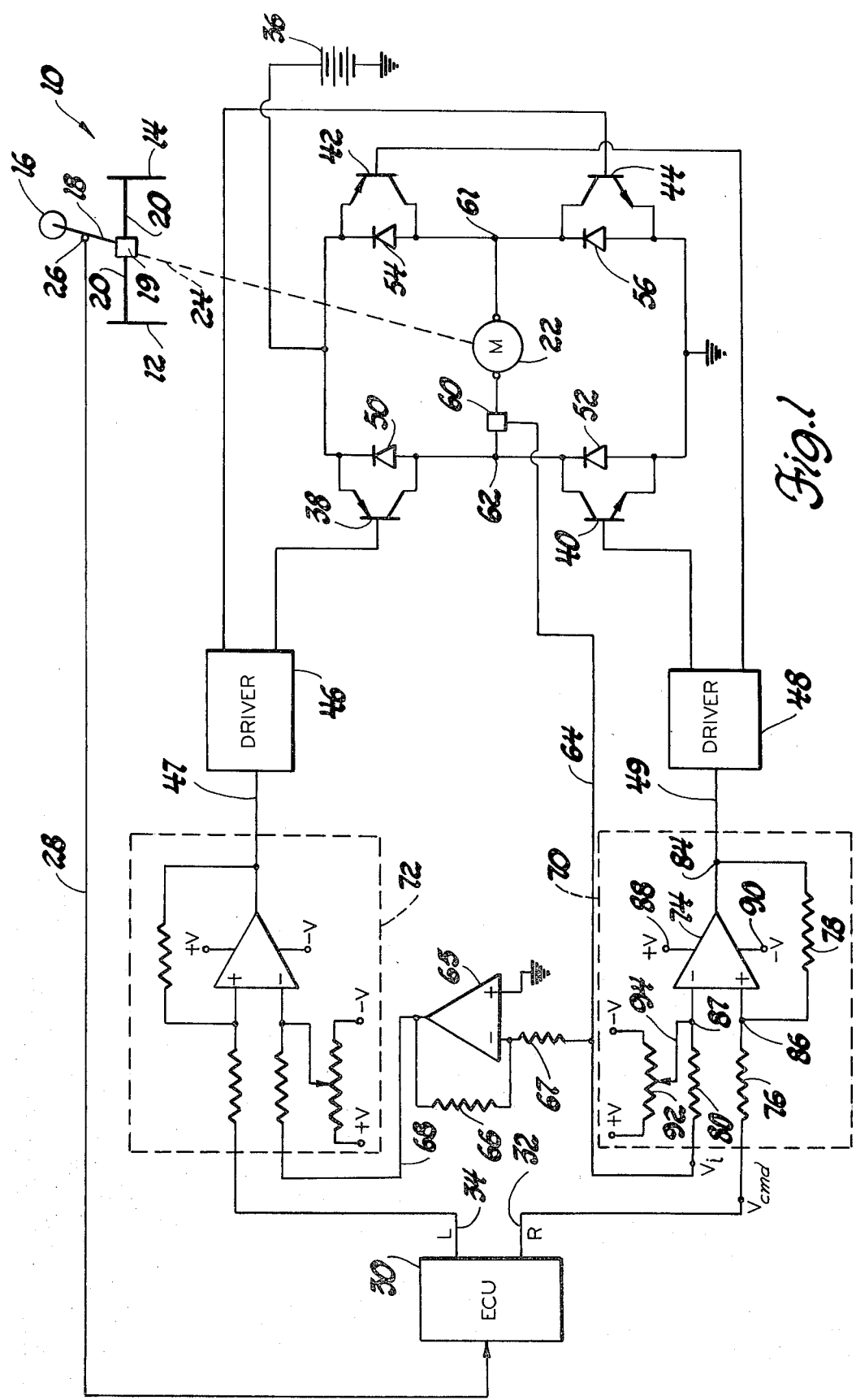

Referring now more particularly to FIG. 1, reference numeral 10 generally designates a vehicle steering system comprising a pair of dirigible wheels 12 and 14 and a steering wheel 16 manually rotatable to steer wheels 12 and 14 through a mechanical linkage system comprising steering column 18, gearbox 19 and steering tie-rod mechanisms 20. An electric motor 22 is mechanically connected to the gearbox 19 as indicated by dashed lines 24 so that energization of the motor 22 produces torque assist for steering the wheels 12 and 14. A torque transducer 26 senses the magnitude and direction of steering torque applied to the steering wheel 16 by the operator of the vehicle and applies an electrical signal in accordance therewith to an electronic control unit (ECU) 30 via line 28. In response to the electrical torque signal on line 28, ECU 30 develops a voltage $V_{cmd}$ indicative of the desired motor current on either right (R) output line 32 or left (L) output line 34. If the operator of the vehicle exerts clockwise torque on steering wheel 16 to effect a righthand steering maneuver, the voltage $V_{cmd}$ appears on right output line 32; if the operator exerts counterclockwise torque on steering wheel 16 to effect a lefthand steering maneuver, the voltage $V_{cmd}$ appears on left output line 34.

Motor 22 is bi-directionally energizable by a vehicle battery 36 through an H-switch comprising power transistors 38-44. The conduction of power transistors 38-44 is controlled by transistor drivers 46 and 48 such that power transistor 38 and 44 are rendered conductive when a positive voltage is applied to the input line 47 of transistor driver 46 and power transistors 40 and 42 are rendered conductive when a positive voltage is applied to the input line 49 of transistor driver 48. Diodes 50-56 are connected across the emitter-collector junctions of power transistors 38-44 in a manner to protect the respective power transistor when motor 22 is de-energized by circulating inductive energy stored in the motor 22 through vehicle battery 36.

A motor current sensor 60 comprising a resistive shunt and suitable amplifier is connected between motor terminals 61 and 62 for providing a voltage $V_i$ on line 64, the magnitude of which varies in direct relation to the instantaneous motor current. The sign of the voltage $V_i$ is positive when the motor current enters terminal 61 and negative when the motor current enters terminal 62. Such voltage is conventionally and hereinafter referred to as the motor current feedback signal or voltage. An inverter comprising operational amplifier 65 and resistors 66 and 67 is responsive to the motor current feedback signal on line 64 and provides a feedback signal on line 68 opposite in sign to the motor current feedback signal on line 64.

Bang-bang current regulator 70 is responsive to the motor current feedback signal on line 64 and the current command signal on right output line 32 for regulating the operation of transistor driver 48 so as to produce an average current in motor 22 which corresponds to the magnitude of the current command signal on line 32. Similarly, the bang-bang current regulator 72 is responsive to the inverted motor current feedback signal on line 68 and the motor current command signal on left output line 34 for regulating the operation of transistor driver 46 so as to produce an average current in motor 22 which corresponds to the magnitude of the current command signal on line 34. The motor current feedback signal on line 64 is positive in sign when current regulator 70 is controlling the motor current and the feedback signal on line 68 is positive in sign when current regulator 72 is controlling the motor current.

Since the operation of current regulators 70 and 72 is identical, further discussion of the same will be confined to current regulator 70, it being understood that such discussion is equally applicable to current regulator 72. Current regulator 70 essentially comprises a comparator 74, a resistor 76 connecting the current command signal $V_{cmd}$ to the comparator noninverting input terminal 86, a resistor 80 connecting the current feedback signal $V_i$ on line 64 to the comparator inverting input terminal 87, and a feedback resistor 78 connecting the comparator output terminal 84 to the comparator noninverting input terminal 86.

A power supply (not shown) generates positive and negative DC voltages $+V$ and $-V$ which are connected to the power input terminals 88 and 90 of comparator 74 as shown. As a result, the output voltage $V_{84}$ of comparator 74 at terminal 84 alternates between $+V$ and $-V$ in accordance with the relative voltage magnitudes applied to the plus and minus input terminals 86 and 87. Feedback resistor 78 cooperates with resistor 76 to produce a voltage potential at plus input terminal 86 which alternates between an upper level (upper trip limit UTL) and a lower level (lower trip limit LTL) as a function of the comparator output voltage $V_{84}$, the current command signal voltage $V_{cmd}$, and the relative magnitudes of resistors 76 and 78. Specifically, the voltage $V_{86}$ at plus input terminal 86 varies according to the expression:

$$V_{86} = V_{cmd} \frac{R_{78}}{(R_{76} + R_{78})} + V_{84} \frac{R_{76}}{(R_{76} + R_{78})}$$

where $R_{76}$ and $R_{78}$ represent the resistances of resistors 76 and 78, respectively, and where the value $V_{84}$ may be either $+V$ or $-V$ as described above. Typically, $R_{78}$ is much larger than $R_{76}$ and the first term of the above expression:

$$V_{cmd} \frac{R_{78}}{(R_{76} + R_{78})}$$

is approximately equal to $V_{cmd}$. Accordingly, the voltage difference between $V_{cmd}$ and the upper and lower trip limits (UTL) and (LTL) is approximately equal to the second term:

$$V_{84} \frac{R_{76}}{(R_{76} + R_{78})}$$

When the output of comparator 74 is high $(+V)$, the voltage $V_{86}$ at terminal 86 corresponds to the upper trip limit (UTL), or approximately:

$$V_{cmd} + V \frac{R_{76}}{(R_{76} + R_{78})}$$

When the output of comparator 74 is low $(-V)$, the voltage $V_{86}$ at terminal 86 corresponds to the lower trip limit (LTL), or approximately:

$$V_{cmd} - V \frac{R_{76}}{(R_{76} + R_{78})}$$

Figure 2:
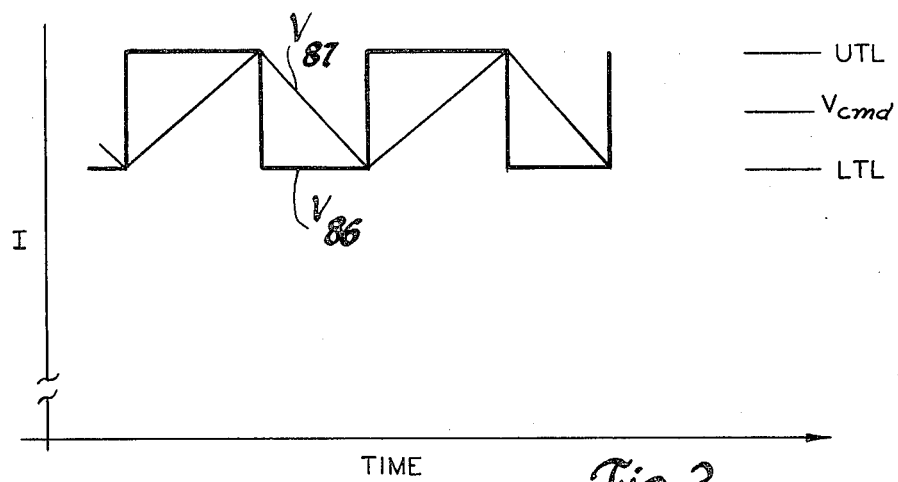

In operation, the comparator 74 compares the voltage $V_{86}$ with the voltage $V_{87}$. When the voltage $V_{87}$ rises above the upper trip limit (UTL) of voltage $V_{86}$, the output voltage $V_{84}$ of comparator 74 falls to its low value $(-V)$, thereby de-energizing motor 22 and lowering the voltage $V_{86}$ to its lower trip limit (LTL). When the motor current, and hence, the voltage $V_{87}$ subsequently falls below the lower trip limit (LTL) of voltage $V_{86}$, the output voltage $V_{84}$ of comparator 74 rises to its high value $(+V)$, thereby energizing motor 22 and raising the voltage $V_{86}$ to its upper trip limit (UTL). This operation is graphically depicted in FIG. 2, where the heavy trace represents the voltage $V_{86}$ and the light trace represents the voltage $V_{87}$. Thus, the power transistors 38–44 are controlled to produce a motor current which "bangs" back and forth between the upper and lower trip limits (UTL) and (LTL) of voltage $V_{86}$.

A potentiometer 92 is connected between positive and negative bias voltages, such as $+V$ and $-V$, and the wiper 94 is connected as a bias input to the inverting terminal of comparator 74. As will be well understood by those skilled in the art, the bias input provides offset compensation for calibration purposes, and the potentiometer wiper 94 is typically adjusted at the time of installation to make the motor current go to zero when the command voltage $V_{cmd}$ is zero.

Figure 3:
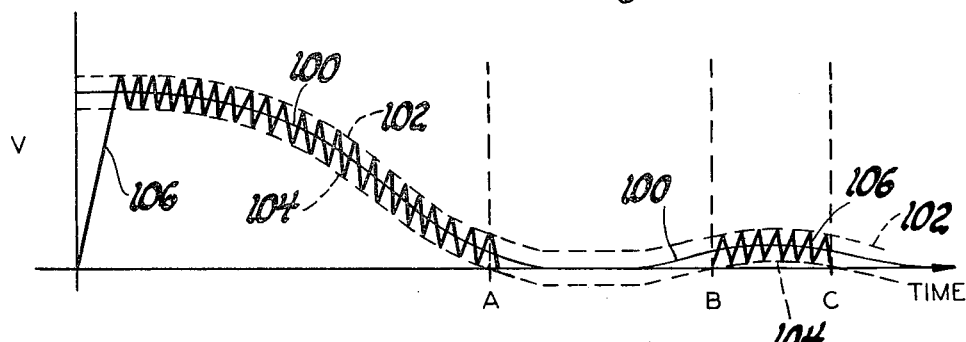

FIG. 3 illustrates the operation of the conventional bang-bang current regulator 70 depicted in FIG. 1 when the command voltage $V_{cmd}$ varies as shown in the solid trace 100. The broken traces 102 and 104 represent the upper and lower trip limits (UTL) and (LTL), respectively, and the solid trace 106 represents the motor current feedback signal voltage $V_i$. As long as the current command signal voltage $V_{cmd}$ is greater than one-half the difference between the upper and lower trip limits (UTL) and (LTL), the motor current bangs back and forth between the upper and lower trip limits (UTL) and (LTL) as described above, and the average motor current is regulated at the command value.

At point A, the command voltage $V_{cmd}$ falls to one-half the difference between the upper and lower trip limits (UTL) and (LTL). At such point, the lower trip limit (LTL) reaches zero and the current regulator 70 is ineffective to re-energize motor 22 since the voltage $V_{87}$ cannot fall below the lower trip limit (LTL). As a result, the motor current stays at zero. It is not until the current command voltage $V_{cmd}$ rises above one-half the difference between the upper and lower trip limits (UTL) and (LTL) at time B that current regulator 70 is effective to re-energize motor 22. At such point, the motor current rises to a value corresponding to the current command voltage $V_{cmd}$. At time C, the current command voltage $V_{cmd}$ again falls to one-half the difference between the upper and lower trip limits (UTL) and (LTL) and the motor current again drops to zero.

When the bang-bang current regulator 70 is used to control the motor current in an electric motor assisted power steering system as shown in FIG. 1, its inability to smoothly regulate the average motor current down to zero produces surges in the amount of steering assist provided every time the current command voltage $V_{cmd}$ rises from zero or falls to zero as shown in FIG. 3. In the electric power steering application, such surges produce unacceptable jerkiness in the steering response, especially when the steering wheel 16 is in the vicinity of the on-center position and the current command voltage $V_{cmd}$ is relatively low.

As noted above, this invention provides a bang-bang current regulator in which the above described performance deficiencies are substantially eliminated. The conventional bang-bang current regulator can only regulate motor current in a continuous mode. When the command voltage $V_{cmd}$ is such that the motor current cannot fall below the lower trip limit (LTL), the motor current abruptly drops to zero until the command voltage is sufficiently raised. In the bang-bang current regulators according to this invention, on the other hand, the motor current is regulated in a continuous mode when the current command voltage $V_{cmd}$ is in the upper end of its range and in a discontinuous mode when the current command voltage $V_{cmd}$ is in the lower end of its range. In this way, average motor current may be smoothly regulated to follow the current command voltage $V_{cmd}$ substantially over its entire range.

Figure 4:
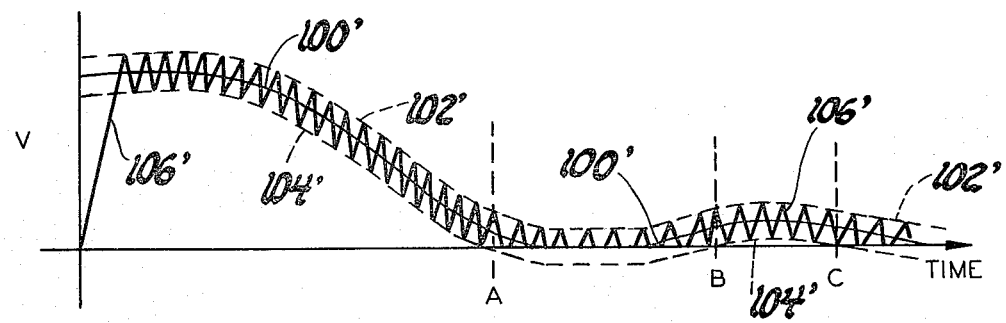
FIG. 4 is a graph depicting a current command signal and the resulting motor current according to the teachings of this invention.

Current regulation according to the teachings of this invention, is graphically depicted in FIG. 4. The current command signal is the same as the signal 100 shown in FIG. 3 and is designated by the reference numeral 100'. Likewise, the corresponding upper and lower trip limits (UTL) and (LTL) are designated by 102' and 104'. When the command signal 100' is less than one-half the difference between the upper and lower trip limits 102' and 104', the motor current 106' is regulated in a discontinuous series of pulses so that the average motor current continues to correspond to the command signal value. When the command signal is increased, continuous motor current regulation is resumed.

Figure 5:
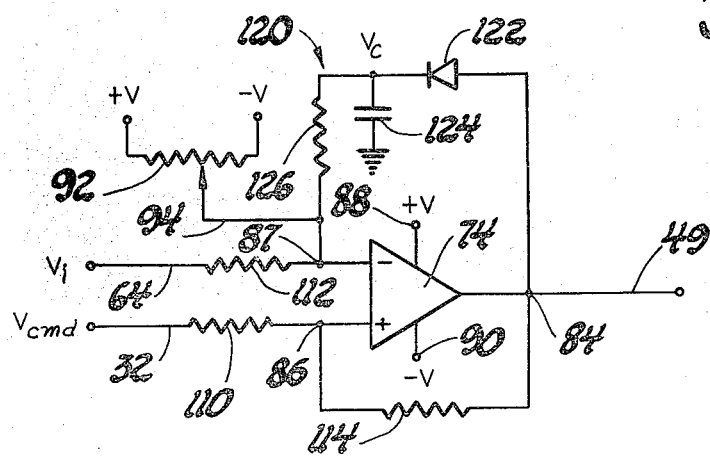
FIG. 5 is a circuit diagram of a bang-bang current regulator configured according to a first embodiment of this invention.
Figure 7:
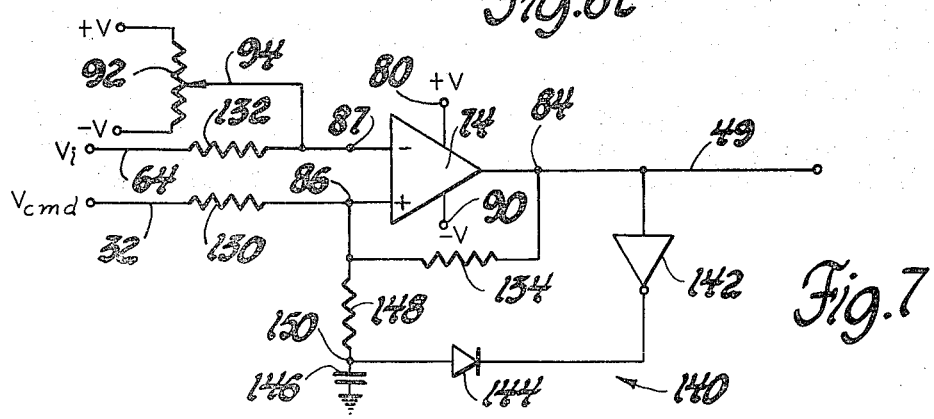
FIG. 7 is a circuit diagram of a bang-bang current regulator configured according to a second embodiment of this invention.

The discontinuous current regulation is achieved according to a first embodiment of this invention depicted in FIG. 5 by altering the apparent motor current feedback signal $V_i$ and according to a second embodiment of this invention depicted in FIG. 7 by altering the apparent current command voltage $V_{cmd}$. In each case, the respective signal $V_i$ or $V_{cmd}$ is altered to make the voltage $V_{87}$ (1) fall below the lower trip limit (LTL) later in time than it otherwise would and (2) rise above the upper trip limit (UTL) sooner in time than it otherwise would. When the current command voltage $V_{cmd}$ is in the upper end of its range, the effect of the alteration is slight, but when the current command voltage $V_{cmd}$ is in the lower end of its range, the alteration provides reduced peak motor current excursion and discontinuous motor current regulation.

Referring now more particularly to FIG. 5, it will be seen that the symbols and reference numerals used in FIG. 1 are repeated where appropriate. Thus, $V_i$ is the motor current feedback signal; $V_{cmd}$ is the motor current command voltage; and $V_{84}$ is the voltage at comparator output terminal 84. Also, as in FIG. 1, the input power supply terminals 88 and 90 of comparator 74 are connected to the logic voltages $+V$ and $-V$, respectively. The current command voltage $V_{cmd}$ on line 32 is connected through resistor 110 to the comparator inverting input terminal 86, and the motor current feedback signal $V_i$ on line 64 is connected through resistor 112 to the comparator noninverting input terminal 87. Feedback resistor 114 is connected between the comparator noninverting input terminal 86 and the comparator output terminal 84. As in FIG. 1, potentiometer 92 is connected to provide a bias input to the inverting terminal 87 of comparator 74 via wiper 94. Thus far described, the current regulator shown in FIG. 5 resembles the current regulator shown in FIG. 1. According to this invention, however, a further circuit designated generally by the reference numeral 120 and comprising a diode 122, a capacitor 124 and a resistor 126, is connected between the comparator output terminal 84 and the comparator inverting input terminal 87. The diode 122 is connected so as to permit capacitor 124 to be charged to $+V$ when the output of comparator 74 is high and to permit the capacitor 124 to discharge through resistor 126 when the output of comparator 74 is at its low level.

When comparator 74 switches from its low output state to its high output state to energize motor 22, capacitor 124 is immediately charged to approximately +V volts through diode 122 and remains so charged until the output of comparator 74 falls to its low voltage level (−V). During such time, the capacitor voltage ($V_c$), is effectively added to the motor current feedback signal $V_i$ through resistor 126. Thus, the voltage applied to the comparator inverting input terminal 87 (the apparent motor current feedback signal) is boosted to a value representative of a higher current level than measured by current sensor 60. Such boosting of the apparent motor current feedback signal operates to make the comparator 74 de-energize motor 22 sooner in time than it otherwise would. At such point, capacitor 124 discharges through resistors 126 and 112 so that the alteration amount is progressively decreased. During this period the decaying capacitor voltage operates to delay the point at which the apparent motor current feedback signal (i.e., the voltage at terminal 87) falls below the lower trip limit (LTL) to re-energize motor 22.

Figure 6A:
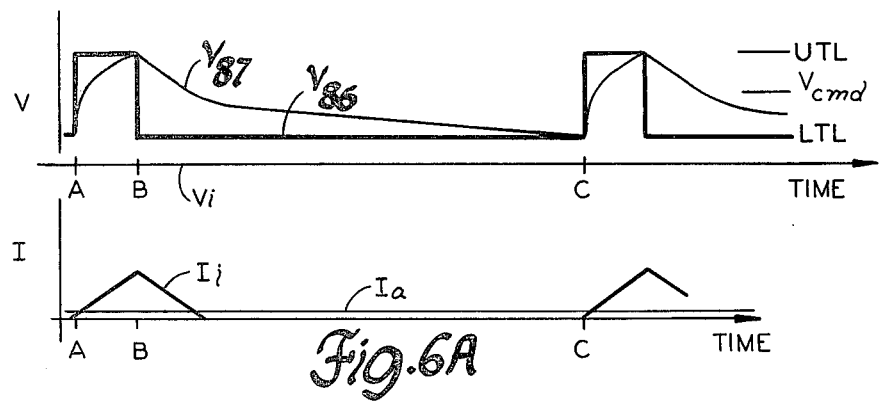
FIGS. 6A–6C are graphs depicting the operation of the current regulator depicted in FIG. 5.
Figure 6B:
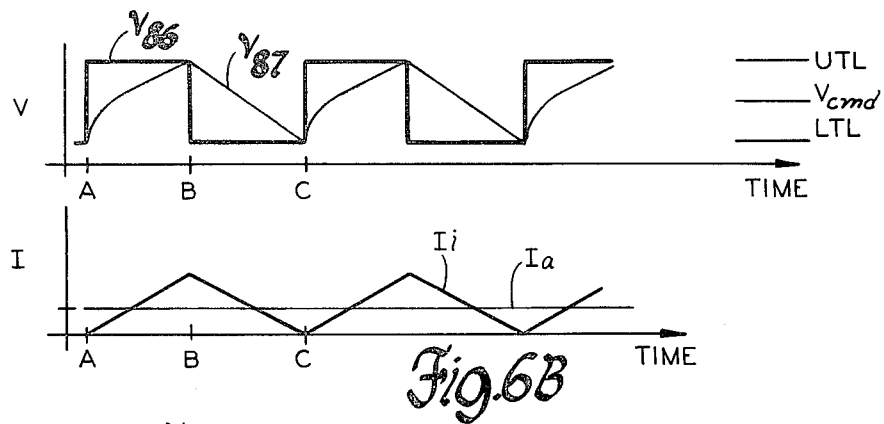
Figure 6C:
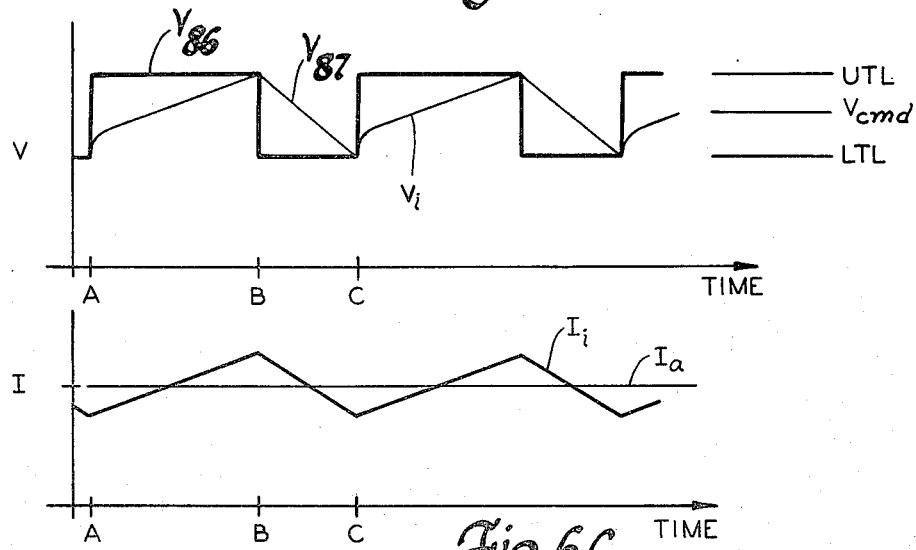

The operation of the current regulator shown in FIG. 5 is graphically depicted in FIGS. 6A–6C for relatively low, medium and high values, respectively, of $V_{cmd}$. Each FIG. 6A–6C comprises two graphs, the first of which depicts the voltages $V_{86}$ and $V_{87}$ and the second of which depicts the instantaneous and average motor current $I_i$ and $I_a$.

Each of the traces in FIGS. 6A–6C commence at time A when the comparator output terminal 84 rises to +V volts to energize motor 22. At such point, the voltage $V_{86}$ rises to the upper trip limit (UTL) as shown and remains at such level until time B when the voltage $V_{87}$ at the comparator inverting input terminal 87 rises above the upper trip limit (UTL). As explained above, the voltage $V_{87}$ is equal to the sum of the current feedback signal $V_i$ and the capacitor voltage $V_c$. At time A, capacitor 124 charges to +V volts through diode 122, and during the interval A–B, the capacitor voltage $V_c$ remains at +V volts. Thus, the amount by which the voltage $V_i$ is boosted or altered, is substantially constant while the motor 22 is energized. The effect of the alteration is to shorten the period of motor energization by causing the voltage $V_{87}$ to exceed the upper trip limit (UTL) sooner in time than it otherwise would. When the motor current is high (as in FIG. 6C), the voltage $V_c$ is small relative to the voltage $V_i$ and the amount by which the motor energization period is shortened is relatively small. When the motor current is low (as in FIG. 6A), the voltage $V_c$ is large relative to the voltage $V_i$ and the amount by which the motor energization period is shortened is relatively large.

At time B, the comparator output voltage $V_{84}$ falls to −V volts to de-energize motor 22. At such point, the voltage $V_{86}$ falls to the lower trip limit (LTL) as shown, and remains at such level until time C when the voltage $V_{87}$ at the comparator inverting input terminal 87 falls below the lower trip limit (LTL). During the interval B–C, the capacitor 124 discharges through resistors 126 and 112 from +V volts toward $V_i$ volts (neglecting the bias voltage). As such, the voltage $V_c$ which boosts or alters the voltage $V_i$ is progressively reduced at a rate determined according to the RC time constant of the circuit and the voltage magnitudes +V and the $V_i$. The voltage $V_c$ operates during this period to extend the interval of motor de-energization by causing the voltage $V_{87}$ to fall below the lower trip limit (LTL) later in time than it otherwise would. When the motor current is high (as in FIG. 6C), the voltage $V_c$ is small in relation to the voltage $V_i$ and the amount by which motor de-energization is extended is slight. When the motor current is low (as in FIG. 6A), the voltage $V_c$ is large in relation to the voltage $V_i$ and motor de-energization extends beyond the point at which the motor current drops to zero.

At time C, the comparator output voltage $V_{84}$ rises to +V volts to energize motor 22. At such time, capacitor 124 is recharged through diode 122 to +V volts and the operation described above is repeated.

As illustrated in the current graph of FIG. 6A, the alteration of the current feedback signal $V_i$ operates to reduce peak motor current excursions in addition to producing discontinuous motor current. As a result, the average motor current designated by $I_a$ in the current graph of FIG. 6A can be regulated to a much lower value than is possible with a conventional bang-bang current regulator as shown in FIG. 1.

A bang-bang current regulator according to a second embodiment of this invention is depicted in FIG. 7. Referring now more particularly to FIG. 7, it will be seen that the reference numerals and symbols used to describe the current regulator 70 in FIG. 1 are repeated in FIG. 7 where appropriate. Thus, $V_i$ is the motor current feedback signal; $V_{cmd}$ is the motor current command signal; and $V_{84}$ is the voltage at comparator output terminal 84. Also, as in FIG. 1, the input power supply terminals 88 and 90 of comparator 74 are connected to the logic voltages +V and −V, respectively. The current command voltage $V_{cmd}$ on line 32 is connected through resistor 130 to the comparator noninverting input terminal 86 and the motor current feedback signal $V_i$ on line 64 is connected through resistor 132 to the comparator inverting input terminal 87. Feedback resistor 134 is connected between the comparator noninverting input terminal 86 and the comparator output terminal 84. A potentiometer 92 is connected to provide a bias input to the inverting input terminal 87 of comparator 74 via wiper 94. As described in reference to FIG. 1, the position of wiper 94 is adjusted at installation for calibration purposes to make the motor current go to zero when the voltage $V_{cmd}$ is zero.

According to the second embodiment of this invention, the regulator circuit additionally includes a circuit generally designated by the reference numeral 140 comprising an inverter 142, a diode 144, a capacitor 146 and a resistor 148, the circuit 140 being connected between the comparator output terminal 84 and the comparator noninverting input terminal 86. Resistor 148 and capacitor 146 are connected in series between the comparator noninverting input 86 and ground potential, and diode 144 and inverter 142 are connected in series between the comparator output terminal 84 and the terminal 150 between resistor 148 and capacitor 146.

When the output of comparator 74 is at its high level energizing motor 22, capacitor 146 discharges to −V volts through diode 144 and inverter 142. During such time, the terminal 150 is held at substantially −V volts and the comparator noninverting input terminal 86 (the apparent current command voltage) is maintained at a voltage that is lower than would otherwise occur. Such alteration of the voltage $V_{86}$ produces the same result as the alteration of the voltage $V_{87}$ described in reference to the first embodiment circuit depicted in FIG. 5—it makes the comparator 74 de-energize the motor 22 sooner in time than it otherwise would. The result is achieved according to the first embodiment of this invention by increasing the apparent motor current feedback signal at terminal 87, and according to the second embodiment of this invention by decreasing the apparent motor current command signal at terminal 86.

When the voltage $V_{87}$ rises above the upper trip limit (UTL) of voltage $V_{86}$, the output of comparator 74 switches to its low output state to de-energize motor 22. At such time, diode 144 ceases to conduct and capacitor 146 begins to charge through resistors 130 and 148 from $-V$ volts toward the lower trip limit (LTL) of the voltage $V_{86}$. As a result, the amount by which the voltage $V_{86}$ was reduced is progressively deceased. Again, such alteration of the voltage $V_{86}$ has the same effect as the alteration of the voltage $V_{87}$ described in reference to the first embodiment circuit depicted in FIG. 5—to extend the period of motor de-energization. This result is achieved according to the first embodiment of this invention by progressively decreasing the amount by which the voltage $V_{87}$ was increased, and according to the second embodiment of this invention by progressively decreasing the amount by which the voltage $V_{86}$ was decreased.

Figure 8A:
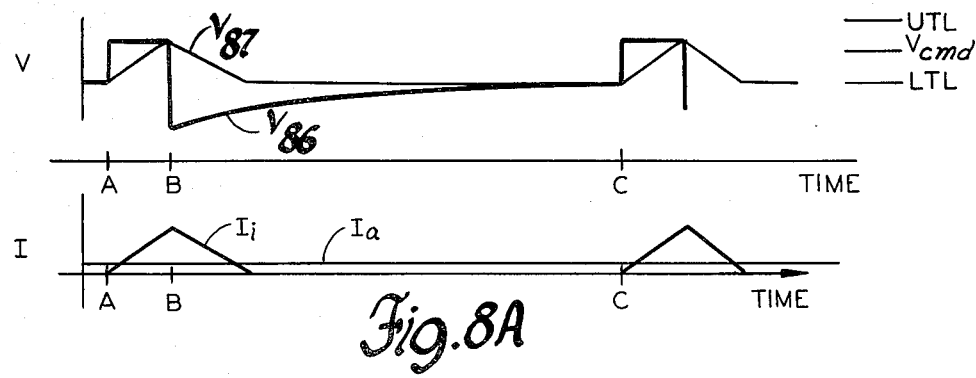
FIGS. 8A–8C are graphs depicting the operation of the current regulator depicted in FIG. 7.
Figure 8B:
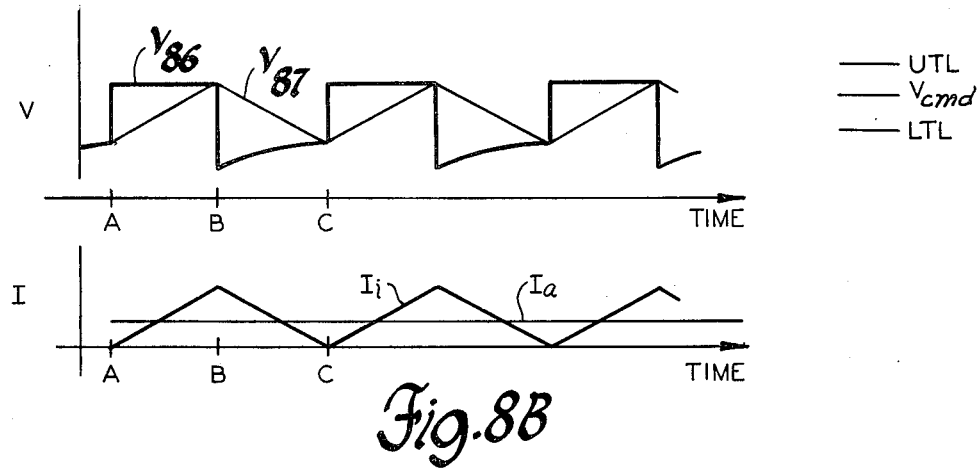
Figure 8C:
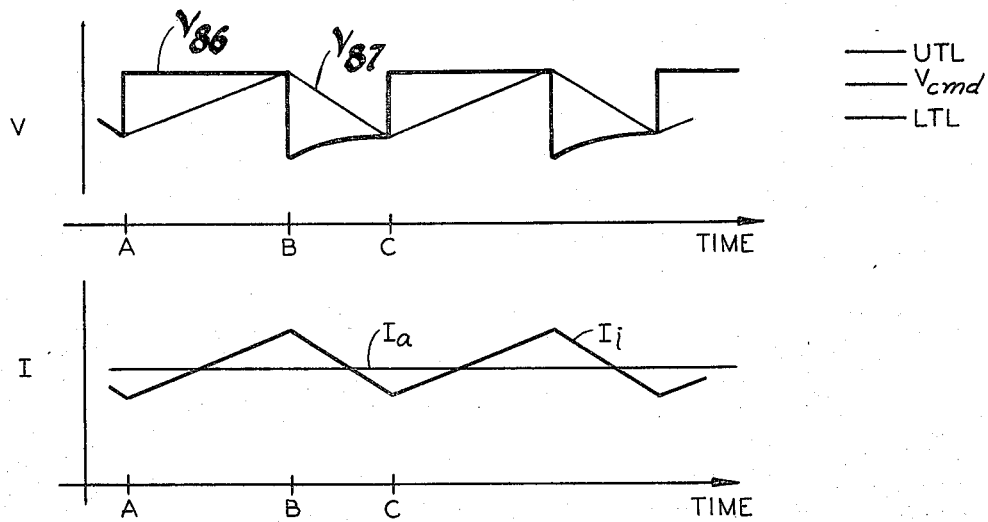

The operation of the current regulator shown in FIG. 7 is graphically depicted in FIGS. 8A-8C for relatively low, medium and high values, respectively, of $V_{cmd}$. As in FIG. 6, each FIG. 8A-8C comprises two graphs, the first of which depicts the voltages $V_{86}$ and $V_{87}$ and the second of which depicts the instantaneous and average motor currents $I_i$ and $I_a$. Also, as shown in FIG. 6, each of the traces in FIGS. 8A-8C commence at time A when the comparator output terminal 84 rises to $+V$ volts to energize motor 22. At such point, capacitor 146 is rapidly discharged to $-V$ volts thereby altering (decreasing) the voltage $V_{86}$ by a fixed amount determined in relation to the relative resistance of resistors 130, 134 and 148. Also, at such point, the motor current and hence the voltage $V_{87}$ begins to increase. The alteration of the voltage $V_{86}$ operates to shorten the period of motor energization by causing the upper trip limit (UTL) of the voltage $V_{86}$ to be exceeded by the voltage $V_{87}$ sooner in time than it otherwise would. When the motor current is high, as in FIG. 8C, the alteration amount is small relative to the voltage $V_{cmd}$ and the amount by which the energization period is shortened is relatively small. When the motor current is low, as in FIG. 8A, the alteration amount is large relative to the voltage $V_{cmd}$ and the amount by which motor energization period is shortened is relatively large.

At time B, the comparator output voltage $V_{84}$ falls to $-V$ volts to de-energize motor 22, and diode 144 ceases to conduct. At such point, the capacitor 146 begins to charge through resistors 130 and 148 toward the lower trip limit (LTL) of voltage $V_{86}$. Such charging has the effect of progressively decreasing the amount by which the voltage $V_{86}$ was altered during motor energization. Thus, the lower trip limit (UTL) voltage of $V_{86}$ progressively increases. At the same time, the voltage $V_{87}$ decreases in relation to the decrease in motor current. When the voltage $V_{87}$ falls below the lower trip limit (LTL) $V_{86}$ at time C, the output of comparator 74 switches to its high state to energize motor 22 and capacitor 146 is again discharged to $-V$ volts.

As with the conventional bang-bang current regulator depicted in FIG. 1, the lowest value of regulated motor current in the current regulators depicted in FIGS. 5 and 7 occurs when the current command signal $V_{cmd}$ is decreased to the point where the motor current feedback signal is unable to fall below the lower trip limit (LTL). With the conventional bang-bang current regulator, this point of operation is characterized by continuous motor current resulting in an average motor current $I_a$ which corresponds to the difference between the upper and lower trip limits (UTL) and (LTL). With the bang-bang current regulators defined according to this invention, however, the lowest point of operation is characterized by reduced peak motor current excursion and discontinuous motor current as seen in FIGS. 6A and 8A, resulting in an average motor current $I_a$ much lower in magnitude than could otherwise be attained. Furthermore, the advantages of the conventional bang-bang current regulator—i.e., inherent stability and fast response—are retained.

The principle of operation for both the first and second embodiments of this invention is the same. One of the command or feedback signals is altered such that the voltage difference between the feedback signal and the upper trip limit (UTL) is decreased while the motor is energized and such that the difference between the feedback signal and the lower trip limit (LTL) is increased while the motor is de-energized. Decreasing the difference while the motor is energized causes the feedback signal to exceed the command signal upper trip limit (UTL) to de-energize motor 22 sooner in time than it otherwise would and increasing the difference while the motor is de-energized causes the feedback signal to fall below the command signal lower trip limit (LTL) to energize motor 22 later in time than it otherwise would. The amount of the alteration is progressively reduced beginning at motor de-energization. The alteration operates to shorten motor energization and to lengthen motor de-energization. When the command signal is in the lower end of its range, the alteration produces motor current in a discontinuous series of reduced peak excursion pulses, enabling the average value of the motor current to be regulated to a lower value than possible without the alteration.

As indicated in reference to the circuits in FIGS. 5 and 7, the relation between the various component values affects the operation of the circuit. In this regard, it has been determined that the most effective current regulation is achieved when the RC time constant of resistor 126 and capacitor 124 in FIG. 5 (resistor 148 and capacitor 146 in FIG. 7) is approximately equal to 1.5 ($T_f$), where $T_f$ is the time required for the motor current to fall from the upper trip limit (UTL) to the lower trip limit (LTL) when the current is being regulated in a continuous manner.

By way of example, and to more clearly illustrate the sort of circuit values used in a practical application of this invention, a listing of the component values of the circuit elements depicted in FIG. 5 is given below.

| | |
|---|---|
| Comparator 74 | MC3302 |
| Resistor 110 | 5.1 kΩ |
| Resistor 112 | 5.1 kΩ |
| Resistor 114 | 130 kΩ |
| Diode 122 | 1N914 |
| Capacitor 124 | .008 μF |
| Resistor 126 | 91 kΩ |

Although this invention has been described in reference to the embodiments illustrated in FIGS. 5 and 7, and in the environment depicted in FIG. 1, it will be understood that the scope of this invention is not limited thereto. Various modifications may occur to those skilled in the art and such modifications may fall within the scope of this invention which is defined by the appended claims.

The embodiments of the invention in which an exclusive property or privilege is claimed are defined as follows:

1. In a motor current regulating system including a motor, a voltage source and a controller responsive to the signal at a command input to which is applied a current command signal indicative of the desired average motor current and the signal at a control input to which is applied a feedback signal indicative of the instantaneous magnitude of the motor current, the controller being effective to define upper and lower trip limits which track the command input signal, to connect the voltage source to the motor when the control input signal falls below the lower trip limit whereupon the motor current begins increasing toward the upper trip limit and to disconnect the voltage source from the motor when the control input signal rises above the upper trip limit whereupon the motor current begins decreasing toward the lower trip limit, thereby to define a continuous motor current which alternately increases and decreases between upper and lower peak values corresponding to the upper and lower trip limits so as to regulate the average motor current at a value corresponding to the current command signal, and thereby to define a minimum regulated average value of the motor current which is reached as the command input signal approaches a value where the lower trip limit reaches zero and the feedback signal cannot fall below the lower trip limit to reconnect the voltage source to the motor, the improvement comprising:

means responsive to the operation of the controller for altering one of the control input or command input signals by an amount which is generally constant in magnitude while the voltage source is connected to the motor and which is progressively reduced while the voltage source is disconnected from the motor, thereby causing the control input signal to rise above the upper trip limit to disconnect the voltage source from the motor sooner in time than it otherwise would and to fall below the lower trip limit to connect the voltage source to the motor later in time than it otherwise would, the alteration being effective for relatively low current command signal values to reduce the upper peak excursion of the motor current and to keep the voltage source disconnected from the motor after the feedback signal has fallen to zero for yielding motor current that is discontinuous in a series of pulses, whereby the average value of the motor current may be regulated down to a lower value than possible without the alteration.

2. A motor current regulating system according to claim 1 wherein the means includes a resistor-capacitor circuit connected to the control input of the controller and a switching element responsive to the operation of the controller for charging the capacitor to a predetermined voltage while the voltage source is connected to the motor and for permitting the capacitor to discharge through the resistor while the voltage source is disconnected from the motor.

3. A motor current regulating system according to claim 1 wherein the means includes a resistor-capacitor circuit connected to the command input of the controller, and a switching element responsive to the operation of the controller for discharging the capacitor to a predetermined voltage while the voltage source is connected to the motor and for permitting the capacitor to be charged through the resistor while the voltage source is disconnected from the motor.

* * * * *